US011927052B2

(12) United States Patent
Walser et al.

(10) Patent No.: US 11,927,052 B2
(45) Date of Patent: Mar. 12, 2024

(54) METHOD AND DEVICE FOR SEALING INSULATED GLASS BLANKS

(71) Applicant: LISEC AUSTRIA GMBH, Seitenstetten (AT)

(72) Inventors: Anton Walser, Pfarrkirchen bei Bad Hall (AT); Leopold Mader, Neuhofen/Ybbs (AT); Markus Lininger, Neuhofen/Ybbs (AT); Erich Lang, Greinsfurth (AT); Franz Haselmayr, Aschbach (AT); Mario Eder, Neumarkt (AT)

(73) Assignee: LISEC AUSTRIA GMBH, Seitenstetten (AT)

( * ) Notice: Subject to any disclaimer, the term of this patent is extended or adjusted under 35 U.S.C. 154(b) by 751 days.

(21) Appl. No.: 16/324,812

(22) PCT Filed: Jul. 6, 2017

(86) PCT No.: PCT/EP2017/066942
§ 371 (c)(1),
(2) Date: Feb. 11, 2019

(87) PCT Pub. No.: WO2018/028902
PCT Pub. Date: Feb. 15, 2018

(65) Prior Publication Data

US 2019/0169924 A1 Jun. 6, 2019

(30) Foreign Application Priority Data

Aug. 11, 2016 (AT) .................................. A 372/2016

(51) Int. Cl.
*E06B 3/673* (2006.01)

(52) U.S. Cl.
CPC ...... *E06B 3/67347* (2013.01); *E06B 3/67382* (2013.01); *E06B 2003/67378* (2013.01)

(58) Field of Classification Search
CPC .......................... E06B 3/67365; E06B 3/67347
See application file for complete search history.

(56) References Cited

U.S. PATENT DOCUMENTS 4,014,733 A * 3/1977 Loubet .................... B29C 66/00 156/446
4,234,372 A 11/1980 Bernhard et al.
(Continued)

FOREIGN PATENT DOCUMENTS

AT 384596 B 12/1987
AT 393 380 B 10/1991
(Continued)

OTHER PUBLICATIONS

Office Action issued in Korean Patent Application No. 10-2019-7006929 dated Apr. 17, 2020 with English translation provided.
(Continued)

*Primary Examiner* — Philip C Tucker
*Assistant Examiner* — John Blades
(74) *Attorney, Agent, or Firm* — NIXON & VANDERHYE

(57) ABSTRACT

Disclosed are a method and device for sealing insulated glass blanks, wherein the insulated glass blank is moved substantially continuously through a sealing station. When sections of the edge joint of the insulated glass blank that are oriented transverse or oblique to the conveying direction are filled with sealing mass exiting from a filling nozzle, the filling nozzle is likewise moved in the conveying direction. When sealing mass is introduced from the filling nozzle into sections of the insulated glass blank that are parallel to the conveying direction, the filling nozzle is not moved in the conveying direction or is moved in the conveying direction at a velocity V2 deviating from the velocity V1 at which the insulated glass blank is moved.

17 Claims, 12 Drawing Sheets

(56) References Cited

U.S. PATENT DOCUMENTS

| | | | | |
|---|---|---|---|---|
| 4,422,541 | A | 12/1983 | Lisec | |
| 4,559,001 | A | 12/1985 | Wiedenhoefer | |
| 4,973,436 | A | 11/1990 | Lisec | |
| 5,136,974 | A | 8/1992 | Lisec | |
| 6,491,966 | B1 * | 12/2002 | Lisec | E06B 3/6733 427/165 |
| 7,922,842 | B2 | 4/2011 | Vianello | |
| 2014/0102622 | A1 | 4/2014 | Mader | |
| 2015/0034231 | A1 * | 2/2015 | Mader | B65G 49/067 156/109 |
| 2015/0354266 | A1 | 12/2015 | Donohue | |
| 2017/0306690 | A1 | 10/2017 | Donohue | |
| 2018/0087313 | A1 | 3/2018 | Donohue | |
| 2018/0230735 | A1 | 8/2018 | Donohue | |

FOREIGN PATENT DOCUMENTS

| | | | |
|---|---|---|---|
| AT | 511 084 | A4 | 9/2012 |
| DE | 2 816 437 | B1 | 8/1979 |
| DE | 2 907 210 | A1 | 9/1979 |
| DE | 2846785 | B1 | 12/1979 |
| DE | 3400031 | C1 | 4/1985 |
| EP | 0 122 405 | A1 | 10/1984 |
| EP | 0 252 066 | A1 | 1/1988 |
| EP | 0 337 978 | A1 | 10/1989 |
| EP | 0 391 884 | A1 | 10/1990 |
| EP | 0 423 106 | A1 | 4/1991 |
| EP | 0 857 848 | A2 | 8/1998 |
| EP | 2 093 369 | A2 | 8/2009 |
| FR | 2 560 813 | A1 | 9/1985 |
| GB | 2 016 960 | A | 9/1979 |
| KR | 10-1340833 | B1 | 12/2013 |
| KR | 10-2014-0075006 | A | 6/2014 |
| WO | 2013/040609 | A1 | 3/2013 |

OTHER PUBLICATIONS

International Search Report, dated Sep. 21, 2017, from corresponding PCT application No. PCT/EP2017/066942.

AT Search Report, dated Feb. 21, 2017, from corresponding AT application No. A 372/2016.

* cited by examiner

1. Step:

2. Step:

3. Step:

METHOD AND DEVICE FOR SEALING INSULATED GLASS BLANKS

BACKGROUND OF THE INVENTION

Field of the Invention

The invention relates to a method and a device for sealing insulating glass blanks.

It is known and—during production of insulating glass—common to fill with sealing compound the edge joint—that is open to the outside and that lies in an insulating glass blank between the glass panes and outside of the spacer—of insulating glass blanks consisting of at least two glass panes with a spacer that is attached in-between and that is connected to the glass panes in order to achieve the ultimate interconnection of glass panes of insulating glass.

During sealing, i.e., while the edge joint of insulating glass blanks is being filled with sealing compound, the sealing compound is introduced into the edge joint from at least one filling nozzle, which is moved along the edge joint of the insulating glass blank.

Description of the Related Art

Methods and devices for sealing insulating glass blanks are known.

For example, reference is made to AT 511 084 A4, EP 0 337 978 A, FR 25 60 813 A, EP 0 252 066 A, GB-A-20 16 960, DE-OS 28 46 785, DE 29 07 210 A1, DE 28 16 437 Bl, and EP 0 391 884 A1.

Known from EP 0 391 884 A1 is a method for sealing insulating glass blanks, in which the movement of the filling nozzle relative to the insulating glass blank is regulated based on the output of sealing compound and on the depth of the edge joint. In this case, the relative speed of the relative movement between insulating glass blank and filling nozzle is changed in such a way that the desired extent of the filling of the edge joint remains constant even in the case of changing depth of the edge joint and/or changing output of sealing compound.

Described in DE 29 07 210 A1 is a method for sealing insulating glass blanks, in which reducing the feed of sealing compound always takes place simultaneously with the slowing of the movement of the insulating glass blank.

In particular, in the known method for sealing insulating glass blanks, it is problematic to transport the insulating glass blanks during and after sealing since sealing compound—as long as it has not yet hardened—is very sticky and clogs transport means, which clamp onto the (lower) edge of the insulating glass blank. In order to solve this problem, various proposals for conveying means have been made. By way of example, reference is made to AT 384 596 B, EP 0 122 405 A, EP 0 857 848 A, and DE 34 00 031 C.

Both during sealing of insulating glass blanks with a filling nozzle ("one-nozzle sealing machine") and during sealing of insulating glass blanks with more than one filling nozzle, in particular with two filling nozzles ("two-nozzle sealing machine"), the movements between the at least one filling nozzle and the insulating glass blank, in order to move the filling nozzle along the edge joint, are achieved by moving the insulating glass blank in the horizontal direction (parallel to the conveying direction of the insulating glass blank) and moving the filling nozzle in the vertical direction (crosswise to the conveying direction of the insulating glass blank). Thus, the insulating glass blank is moved linearly during the filling of edge joints with gaps parallel to the transport direction, and the filling nozzle in the case of the stationary insulating glass blank is moved crosswise to the conveying direction when edge joints oriented crosswise to the conveying direction are to be filled.

In the case of known devices, the filling nozzle can be moved on a beam that is oriented crosswise to the conveying direction, which beam is fastened in a non-adjustable manner on the machine frame in the conveying direction. This also applies for devices with two filling nozzles. In the case of the known sealing machines, the filling nozzle or the filling nozzles cannot be moved in the conveying direction of the insulating glass blank.

Also known is a method for sealing insulating glass blanks ("Erdmann Method") using a one-nozzle sealing machine.

The one-nozzle sealing machine by Erdmann with the type designation "7500 Series Vertical IG Secondary Sealer" is arranged in an insulating glass line of the "Erdmann Vertical Insulating Glass (IF) Line" type (cf. www.youtube-.com/watch?v=GlwRurxOtVo, uploaded on 10/02/2010). The sealing machine has a support wall for insulating glass blanks that is formed from several beams mounted in a stationary manner in the machine frame and equipped with free-wheeling rollers. On the lower edge of the support wall, linear conveyors are provided in the form of conveyor belts with lateral guide rollers (on the intake side) and in the form of conveyor rollers (on the discharge side). The intake-side linear conveyor is lowered during execution of the sealing. Between the intake-side linear conveyor and the lowermost beam of the support wall equipped with rollers, suction heads that can be adjusted back and forth crosswise to the support wall are provided as holding systems for the insulating glass blank that is to be sealed. The suction heads can be attached to an insulating glass blank that is to be sealed. During sealing, the insulating glass blank is held exclusively by the suction heads, which are arranged in the support wall, so that the edges of the insulating glass blank are free and the sealing nozzle can be moved around the latter along the four edges of the insulating glass blank, while sealing compound is filled into the edge joint of the insulating glass blank. One support finger is assigned to each suction head. The support fingers can be pivoted around horizontal swivel axes independently of one another from a readiness position into an approximately horizontal operating position. When a triple-insulating glass blank is to be sealed, a support finger is pivoted upward from below adjacent to the lower edge of the insulating glass blank. The support finger is pivoted downward when the sealing nozzle is moved during sealing along the lower edge of the insulating glass blank.

In the case of the known methods for sealing and in the devices that are proposed in this respect, it is problematic that because of the filling nozzle/filling nozzles that cannot be adjusted or moved in the conveying direction, the movement of the insulating glass blank through a sealing station during sealing of edge joints, which run crosswise to the direction of movement of the insulating glass blank, has to be interrupted and resumed again. This extends the cycle time because of the braking and acceleration of the insulating glass blank. This problem occurs in particular in the case of large and heavy insulating glass blanks.

SUMMARY OF THE INVENTION

The object of the invention is to configure the sealing of insulating glass blanks in such a way that the drawbacks that arise during sealing due to the braking and accelerating of insulating glass blanks no longer exist.

This object is achieved according to the invention with a method with the features of claim 1, on the one hand, and with a device that has the features of the independent claim directed toward the device, on the other hand.

Preferred and advantageous configurations of the invention are the subject matter of the subclaims.

The basic idea of the invention is that the at least one filling nozzle is moved during the sealing, in particular at least during individual sections of the sealing, parallel to the direction in which the insulating glass blank is moved during the sealing. The filling nozzle can be moved during the sealing in the same direction as the insulating glass blank that is to be sealed or in the opposite direction.

In a possible embodiment of the method according to the invention, it is provided to move the insulating glass blank, which is to be sealed, continuously during the sealing, whereby the at least one filling nozzle is moved with the insulating glass blank when areas of the edge joint of the insulating glass blank that are not parallel to the direction of movement (conveying direction) of the insulating glass blank are sealed.

In the case of the invention, the problems connected with the slowing-down (braking) and accelerating of the insulating glass blank that is to be sealed no longer exist.

In certain cases, it can occur that the insulating glass blank is (briefly) halted during the sealing. Such a case exists, for example, when long (large) insulating glass blanks are to be sealed in the conveying direction. In such cases, the area in which the filling nozzle can be moved in the conveying direction may be too short, so that the filling nozzle is at the end of its area of movement before the section of the edge joint of the insulating glass blank that is to be filled with sealing compound and is oriented crosswise to the conveying direction is filled (sealed). This only occurs in exceptional cases, however.

Usually, the method according to the invention makes it possible for the insulating glass blank according to a preferred embodiment of the method to be moved in the conveying direction continuously optionally at various high speeds.

It also allows the possibility provided according to the invention of moving the filling nozzle also in the conveying direction so that in the case of small insulating glass blanks, the procedure is that only the filling nozzle is moved and the insulating glass blank is not moved or moves only slightly in the conveying direction.

Within the scope of the invention, consideration is also given to changing the speed at which the filling nozzle is moved in order to match it to the circumstances prevailing in each case (size of the insulating glass blank, cross-sectional size of the edge joint of the insulating glass blank). The speed of the movements of the filling nozzle both in the conveying direction and crosswise to the conveying direction may not be constant, but rather can be changed within the scope of the invention even during a sealing process.

In the case of the invention, the possibilities are allowed of changing not only the speed at which the insulating glass blank is moved (in the conveying direction), but also the speed at which the filling nozzle is moved, of changing in particular independently of one another, so that cycle times are optimized and the (horizontal) dimensions of the sealing station are reduced, without the advantages of the invention being lost.

Another advantage of the invention consists in matching the cycle times of the method according to the invention and the device according to the invention to the capacities of upstream and downstream system parts without having an adverse effect on the quality of the sealing of insulating glass blanks. This has the effect that no dust develops in the system parts (e.g., gas-filling presses) upstream in the sealing station, since the sealing takes too long, on the one hand, and downstream system parts (e.g., stacking systems) do not have to hold onto sealed insulating glass blanks, i.e., finished insulating glass, on the other hand.

During sealing of parallel sections of edge joints or ("oblique") sections of edge joints that are arranged at an angle other than a right angle to the conveying direction, the necessary relative movement between the filling nozzle and the insulating glass blank can be achieved by only the insulating glass blank being moved or by both the insulating glass blank and the filling nozzle being moved in the conveying direction at speeds that are different from one another.

When filling sections of the edge joint that are parallel to the conveying direction, the filling nozzle is not moved crosswise to the conveying direction.

When "oblique" or "curved" sections of the edge joint are to be filled with sealing compound, the filling nozzle is moved crosswise to the conveying direction in order to follow the "oblique" or "curved" section of the edge joint.

One advantage of the procedure that is proposed according to the invention during sealing of insulating glass blanks also lies in the fact that the passive adjustment of the amount of sealing compound, which is released from the filling nozzle into the edge joint per time unit, can be compensated by the swift adjustment in speed of the movements of the filling nozzle and/or the insulating glass blank.

Another advantage of the method according to the invention and the device according to the invention lies in the fact that the movements of the insulating glass blank that are required in the state of the art, without the latter being sealed ("idling"), in order to align the latter correctly for sealing relative to the at least one filling nozzle, are superfluous.

In one embodiment of the method of the invention, it can be provided that the insulating glass blank, while it is being sealed, is moved continuously in one direction (conveying direction).

In one embodiment of the method of the invention, it can be provided that the at least one filling nozzle is stopped in the conveying direction during the introduction of sealing compound into sections of the edge joint of the insulating glass blank, which are oriented parallel to the conveying direction, or is moved at a speed $V_2$ that is different from the speed $V_1$ of the movement of the insulating glass blank.

In one embodiment of the method of the invention, it can be provided that the at least one filling nozzle is moved in the conveying direction and in addition crosswise to the conveying direction while the sealing compound is being introduced into sections of the edge joint oriented crosswise to the conveying direction at the same speed $V_2$ as the insulating glass blank.

In one embodiment of the method of the invention, it can be provided that the at least one filling nozzle is moved crosswise to the conveying direction in addition to its movement parallel to the conveying direction during the introduction of filling compound into sections of the edge joint, which form an angle in the conveying direction.

In one embodiment of the method of the invention, it can be provided that a single filling nozzle is used, from which in succession sealing compound is introduced into all sections of the edge joint of an insulating glass blank.

In one embodiment of the method of the invention, it can be provided that the at least one filling nozzle is moved in the conveying direction at a speed $V_2$ while sealing compound is being introduced into a section of the edge joint oriented parallel to the conveying direction, which speed is different from the speed $V_1$ of the movement of the insulating glass blank, in particular higher, in such a way that the filling nozzle, relative to the conveying direction, moves from one end of the section of the edge joint to the other end of the section of the edge joint.

In one embodiment of the method of the invention, it can be provided that two filling nozzles are used.

In one embodiment of the method of the invention, it can be provided that one of the filling nozzles introduces sealing compound only into the section of the edge joint that extends parallel to the conveying direction and is adjacent to the conveying system, and the second filling nozzle introduces sealing compound into the other section of the edge joint of the insulating glass blank.

In one embodiment of the method of the invention, it can be provided that the first and the second filling nozzle simultaneously introduce sealing compound into sections of the edge joint of the insulating glass blank that are oriented parallel or at an oblique angle to the conveying direction.

In one embodiment of the method of the invention, it can be provided that the insulating glass blank during the introduction of sealing compound in the conveying direction is moved at various high speeds $V_1$.

In one embodiment of the method of the invention, it can be provided that the insulating glass blank is held during the bringing in or removal and during the sealing by suction devices that are loaded with underpres sure placed on a surface of a first glass pane of the insulating glass blank, and the second glass pane of the insulating glass blank is supported by support elements that clamp onto it exclusively from below.

In one embodiment of the method of the invention, it can be provided that the support elements that clamp onto the second glass pane of the insulating glass blank in the area of the at least one filling nozzle are removed from the second glass pane of the insulating glass blank.

In one embodiment of the method of the invention, it can be provided that the support elements on the second glass pane of the insulating glass blank lie before and after the filling nozzle, which introduces sealing compound into the lower, horizontal section of the edge joint of the insulating glass blank.

In one embodiment of the device of the invention, it can be provided that the conveying system for the insulating glass blank is equipped for continuous conveying of the insulating glass blank during the entire sealing.

In one embodiment of the device of the invention, it can be provided that the conveying system comprises a linear conveyor that clamps onto the lower edge of the insulating glass blank and a roller beam that is provided in the area of the upper edge of the insulating glass blank.

In one embodiment of the device of the invention, it can be provided that the linear conveyor comprises suction devices and support elements, which can be moved together and synchronously in the conveying direction of the insulating glass blank.

In one embodiment of the device of the invention, it can be provided that the suction devices laterally clamp onto the surface of one glass pane of the insulating glass blank, which surface faces the machine frame of the device, and the support elements clamp—from below —onto the glass pane of the insulating glass blank that faces away from the machine frame of the device.

In one embodiment of the device of the invention, it can be provided that support elements in the area of the filling nozzle can be removed from the lower edge of the glass pane of the insulating glass blank.

In one embodiment of the device of the invention, it can be provided that the support elements have a support head and a bendable support arm.

In one embodiment of the device of the invention, it can be provided that an actuating element for bending the support arm of the support elements is assigned to the nozzle head that has the at least one filling nozzle.

In one embodiment of the device of the invention, it can be provided that the suction devices and the support elements of the linear conveyor, combined into conveyor units, are arranged on a carrier.

In one embodiment of the device of the invention, it can be provided that the suction devices and the support elements are guided onto a continuous, self-contained conveyor track.

In one embodiment of the device of the invention, it can be provided that the at least one filling nozzle is arranged on a sealing head, which can be adjusted on a beam crosswise to the conveying direction, and the beam, which carries the sealing head, can be moved parallel to the conveying direction of the insulating glass blank.

In one embodiment of the device of the invention, it can be provided that the beam for introducing sealing compound into sections of the edge joint of the insulating glass blank that are tilted in the conveying direction can be moved synchronously with the insulating glass blank in the conveying direction.

BRIEF DESCRIPTION OF THE DRAWINGS

Further details and features of the invention follow from the description below of preferred embodiments based on the drawings. Here.

DESCRIPTION OF THE PREFERRED EMBODIMENTS

Figure 1:
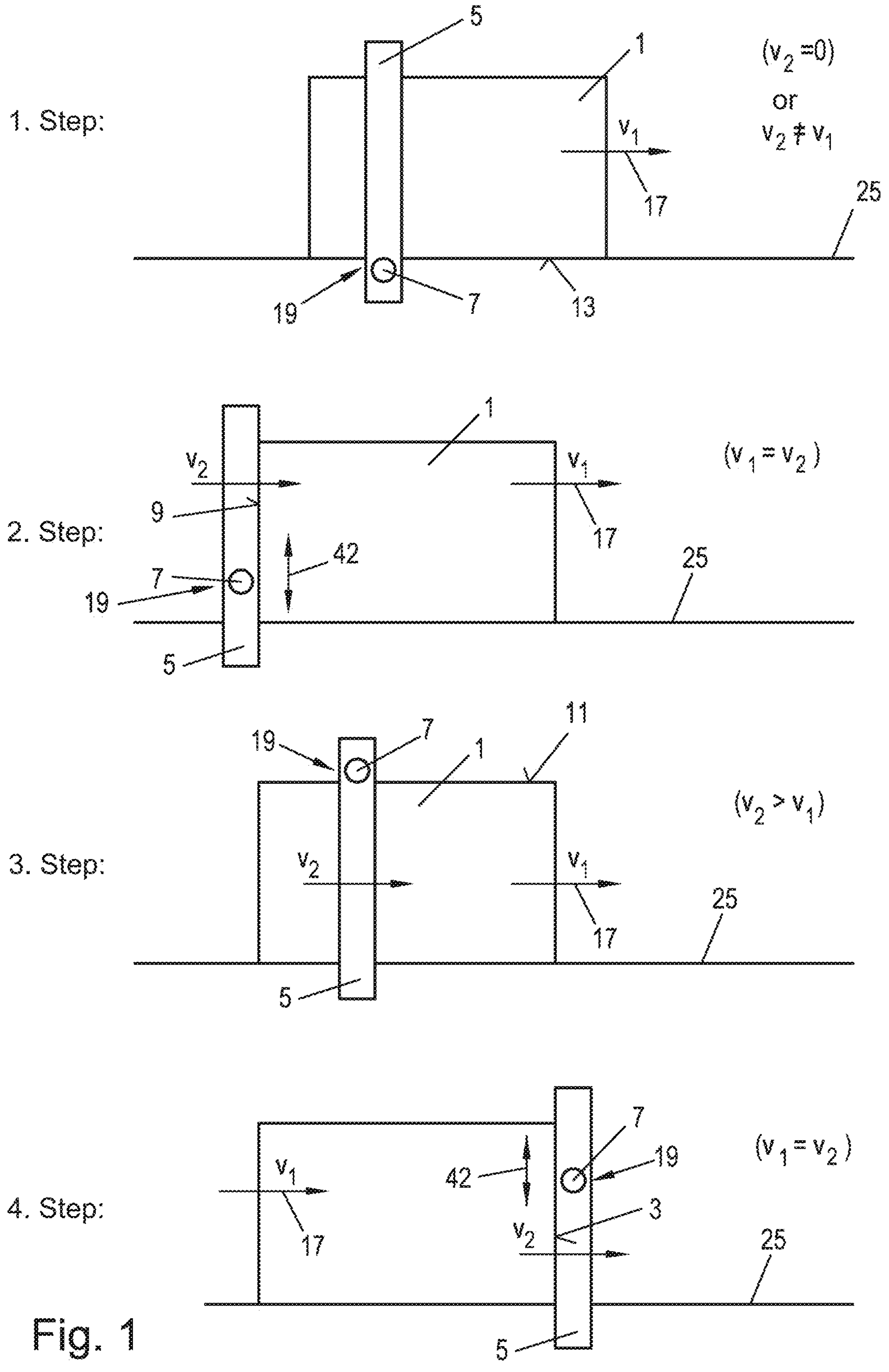
FIG. 1 diagrammatically shows steps during sealing of an insulating glass blank with a filling nozzle, FIG. 2 diagrammatically shows steps during sealing of an insulating glass blank with two filling nozzles.

The description below describes the sealing of insulating glass blanks, which are moved (transported) during sealing, as now commonly used, essentially oriented vertically through a sealing device (sealing station). Not withstanding the above, the method according to the invention is not limited to the sealing of insulating glass blanks that are oriented vertically during sealing. Rather, insulating glass blanks that are moved horizontally by a sealing device can also be sealed with the method according to the invention.

In the method according to the invention, for example, the procedure can be as follows:

First, the lower, horizontal section 13, parallel to the conveying direction, of the edge joint of the insulating glass blank 1 is filled, whereby the insulating glass blank 1 is moved continuously. The filling nozzle 7 can be moved parallel to the conveying direction (arrow 17) of the insulating glass blank 1 at a speed other than the speed of the insulating glass blank 1. In this case, the filling nozzle 7 may not be moved, however.

Then, the rear (vertical) section 9 of the edge joint of the insulating glass blank 1, where said section is oriented crosswise to the conveying direction, relative to the conveying direction, is filled, whereby the beam 5 with the filling nozzle 7 (sealing nozzle) is moved synchronously with the insulating glass blank 1, and the filling nozzle 7 for filling the rear section 9 of the edge joint is moved downward or upward along the beam 5.

When the upper, horizontal section 11 of the edge joint of the insulating glass blank 1 is being filled, the insulating glass blank 1 in addition is moved continuously in order to achieve a relative movement between filling nozzle 7 and insulating glass blank 1. The filling nozzle 7 can be moved parallel to the conveying direction (arrow 17) of the insulating glass blank 1 at a speed other than the speed of the insulating glass blank 1, but does not have to be moved.

For filling the front (vertical) section 3 of the edge joint, oriented crosswise to the conveying direction, the procedure is as described in connection with the filling of the rear section 9 of the edge joint of the insulating glass blank 1.

Figure 2:
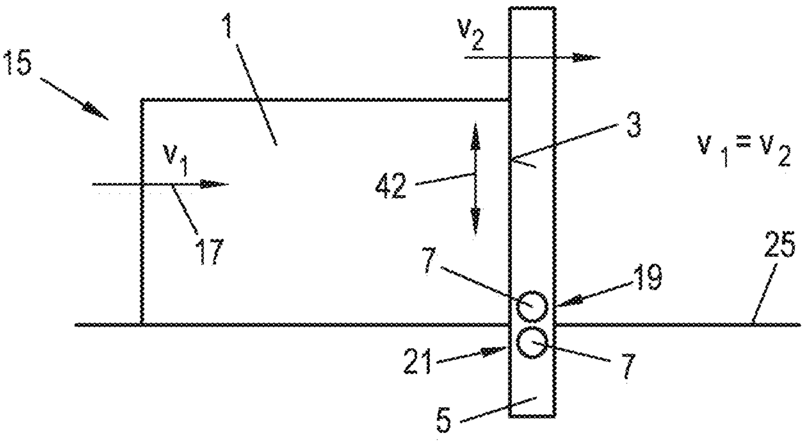
Figure 2:
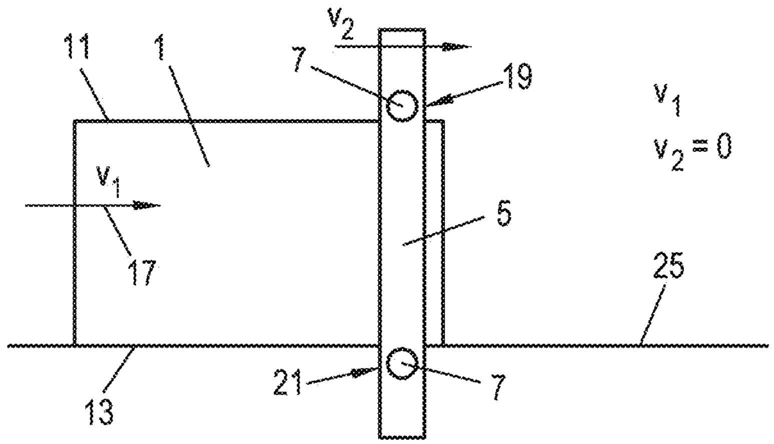
Figure 2:
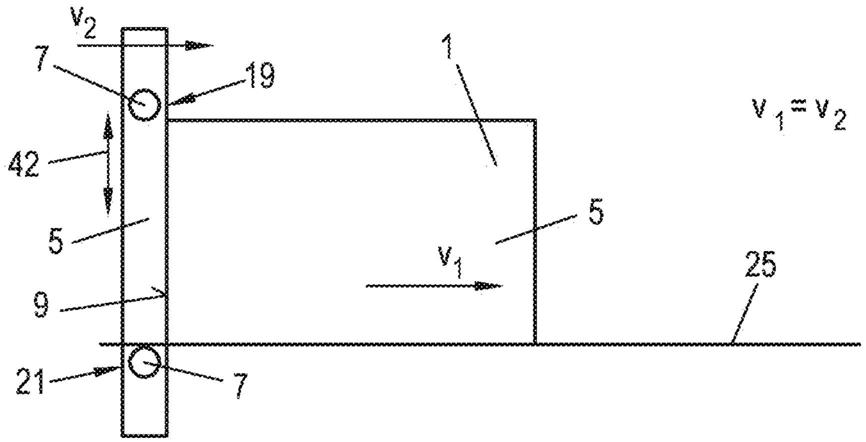
Figure 3:
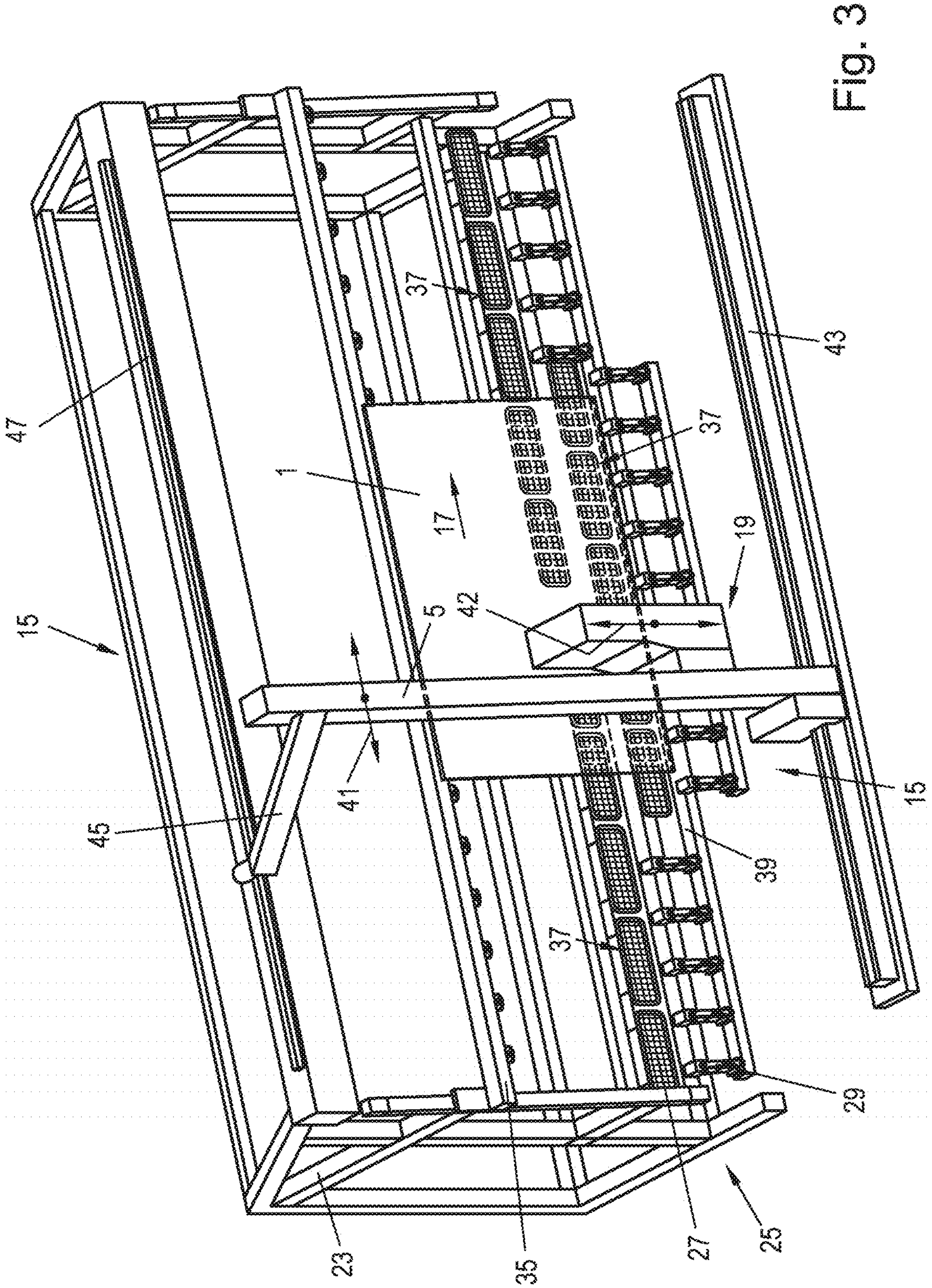
FIG. 3 shows a first embodiment in oblique view.

When filling sections of the edge joint, which are oriented parallel to the conveying direction (arrow 17) of the insulating glass blank 1, the filling nozzle 7 can be moved onto the sealing head 19, and the filling nozzle 7 shown in FIG. 2 can be stopped on the sealing head 21 ($V_2=0$) or can be moved at a speed ($V_2$), which is different from the speed ($V_1$), at which the insulating glass blank 1 is moved ($V_2 \neq V_1$). This also applies for sections of the edge joint of the insulating glass blank 1, which are oriented obliquely to the conveying direction (arrow 17), whereby while oblique sections of the edge joint are being filled, the filling nozzle 7 is moved along the beam 5 so that it follows this section of the edge joint. Correspondingly, the procedure can be carried out while curved sections of the edge joint of an insulating glass blank are being filled.

The movement of the sealing head 19 with the filling nozzle 7 (and also of the optionally provided second sealing head 21 with the filling nozzle 7) in conveying direction (arrow 17) is carried out by moving the beam 5.

For example, when the sealing station 15 has (only) one filling nozzle 7 (FIG. 1), the procedure can be as follows:

1st Step:

The insulating glass blank 1 is moved by a conveying system 25 at a speed $V_1$ in the direction of the arrow 17 through the sealing station 15. In the case of, for example, a stationary beam 5 ($V_2=0$) or with a beam 5 that is moved at a speed $V_2$ other than speed $V_1$, and in the case of a sealing head 19 that is stopped in the direction of the lengthwise extension of the beam 5 with the filling nozzle 7, the filling nozzle 7 fills the lower, horizontal section 13 of the edge joint of the insulating glass blank 1.

2nd Step:

The insulating glass blank 1 moves forward at a speed $V_1$ in the direction of the arrow 17 through the sealing station 15. At the same time, the beam 5 with the sealing head 19 moves synchronously with the insulating glass blank 1 at the speed $V_2$ and in the same direction (arrow 17) as the latter, whereby $V_1=V_2$ applies. In this case, the sealing head 19 with the filling nozzle 7 travels along the rear, vertical section 9 of the edge joint upward (arrow 42) relative to the conveying direction (arrow 17) and fills the section 9.

3rd Step:

The insulating glass blank 1 is moved forward in the direction of the arrow 17 at a speed $V_1$.

The beam 5 with the sealing head 19 is moved in the direction of the arrow 17 at a speed $V_2$, which is different, in particular higher, than that of the insulating glass blank 1 ($V_2>V_1$), whereby the filling nozzle 7—because of the difference in speeds $V_1$ and $V_2$ at which the insulating glass blank 1 and the beam 5 are moved—moves along the upper horizontal section 11 of the edge joint of the insulating glass blank 1 and fills the latter with sealing compound.

When the upper section 11 of the edge joint of the insulating glass blank 1 is oriented obliquely to the conveying direction (arrow 17) or curved, the sealing head 19 with the filling nozzle 7 is moved in addition along the beam 5, so that the filling nozzle 7 follows the oblique or curved section 11 of the edge joint. In this case, the beam 5 can be moved in addition in (or against the) conveying direction (arrow 17) (in this case, $V_2 \neq V_1$ applies).

4th Step:

The insulating glass blank 1 is moved forward in the sealing station 15 by the conveying system 25 and continuously at a speed $V_1$ in the direction of the arrow 17.

At the same time, the beam 5 with the sealing head 19 is moved with the filling nozzle 7 synchronously with the insulating glass blank 1 and at the speed $V_2$ in the same direction (arrow 17), whereby $V_1=V_2$ applies. In this case, the sealing head 19 travels with the filling nozzle 7 along the beam 5 downward (arrow 42) and fills the front, vertical section 3 of the edge joint of the insulating glass blank 1 relative to the conveying direction (arrow 17).

When a sealing station 15 with two filling nozzles 7 is used for sealing insulating glass blanks, the procedure can be as is described below relative to FIG. 2:

1st Step:

An insulating glass blank 1 is moved by the conveying system 25 into the sealing station at a speed $V_1$ in the direction of the arrow 17. At the same time, the beam 5 with two sealing heads 19 and 21 (the sealing head 21 can also be attached in the machine frame of the sealing station 15) with one filling nozzle 7 each is moved synchronously with the insulating glass blank 1 and in the same direction (arrow 17) as that at the speed $V_2$, whereby $V_1=V_2$ applies. The sealing head 19 with its filling nozzle 7 travels along the beam 5 upward (arrow 42) and fills the front, vertical section 3 of the edge joint of the insulating glass blank 1, relative to the conveying direction (arrow 17), with sealing compound. The second sealing head 21 remains inactive in this step.

2nd Step:

The insulating glass blank 1 is continuously moved forward in the direction of the arrow 17 at a speed $V_1$. The beam 5 with the sealing head 19 and the sealing head 21 is stopped ($V_2=0$) or is moved at a speed $V_2$ other than speed $V_1$ ($V_2 \neq V_1$); the filling nozzle 7 of the sealing head 19 fills the upper section 11 of the edge joint, and the filling nozzle 7 of the second sealing head 21 fills the lower section 13 of the edge joint of the insulating glass blank 1 with sealing compound.

When the upper section 11 of the edge joint of the insulating glass blank 1 is oriented obliquely to the conveying direction (arrow 17) or is curved, the sealing head 19 with the filling nozzle 7 is moved along the beam 5 in such a way that the filling nozzle 7 of the edge joint also follows the oblique or curved section 11. In this case, the beam 5 can be moved in addition in (or against) the conveying direction (arrow 17) (in this case, $V_2 \neq V_1$ applies).

3rd Step:

The insulating glass blank 1 is moved continuously at a speed $V_1$ in the direction of the arrow 17. The beam 5 with the sealing heads 19 and 21 is moved at the speed $V_2$ in the direction of the arrow 17 and synchronously with the insulating glass blank 1. In this case, $V_1 = V_2$ applies.

At the same time, the sealing head 19 with the filling nozzle 7, which last filled the upper section 11 of the edge joint, travels downward along the beam 5 (arrow 42) and fills the rear section 9, relative to the conveying direction (arrow 17), of the edge joint of the insulating glass blank 1 with sealing compound. In this step, the sealing head 21 is inactive.

Both in the procedure according to FIG. 1 ("one-nozzle sealing machine") and in the procedure according to FIG. 2 ("two-nozzle sealing machine"), the speed $V_1$ at which the insulating glass blank 1 is moved through the sealing station 15 during sealing does not have to be the same in all sections (steps) of the method. It is only essential that the insulating glass blank 1—except in the cases explained above—not remain standing during the sealing, and the beam 5 with the at least one sealing head 19 is moved in (or against) the conveying direction, for example synchronously with the insulating glass blank 1, during sealing of sections of the edge joint oriented crosswise or at an oblique angle to the conveying direction, which sections start from the lower, horizontal section 13 of the edge joint, such as, for example, the sections 3 and 9 of the edge joint.

The method according to the invention is also suitable for the sealing of so-called shape panes, i.e., insulating glass blanks 1 with shapes other than rectangular or square (with at least one "oblique" and/or curved edge), as has been further explained above with reference to the procedures shown in FIGS. 1 and 2.

The exemplary embodiment of a device according to the invention (sealing station 15), shown in FIGS. 3 to 6, comprises a machine frame 23, in and on which the various system parts are arranged.

In the machine frame 23, a conveying system 25 for insulating glass blanks 1 that are to be sealed is provided. The conveying system 25 comprises suction devices 27 and support elements 29 that are assigned to the suction devices 27. In this case, it is provided that the suction devices 27 clamp onto the rear surfaces, facing the machine frame 23, of one glass pane 33 of an insulating glass blank 1 and clamp the support elements 29 on the lower edge (only) of the front glass pane 31 of the insulating glass blank 1 facing away from the machine frame 23. Thus, a movement (dropping) of the front glass pane 31 relative to the rear glass pane 33 of the insulating glass blank 1, held by the suction devices 27, is prevented. In addition, parts of the conveying system 25 are prevented from coming into contact with and contaminating the sealing compound introduced into the edge joint of an insulating glass blank 1. Moreover, the device 15 is also suitable for sealing insulating glass blanks 1 for stepped elements (the glass panes of the insulating glass blank 1 are not the same size).

The upper edge of the insulating glass blank 1 is supported by a roller beam 35, which clamps onto the rear surface of the glass pane 33 and is arranged such that it can be adjusted depending on height in the machine frame 23 so that it can be adjusted crosswise to the conveying direction (arrow 17) in such a way that it clamps onto the insulating glass blank 1 (only) in the area of the upper edge.

Figure 6:
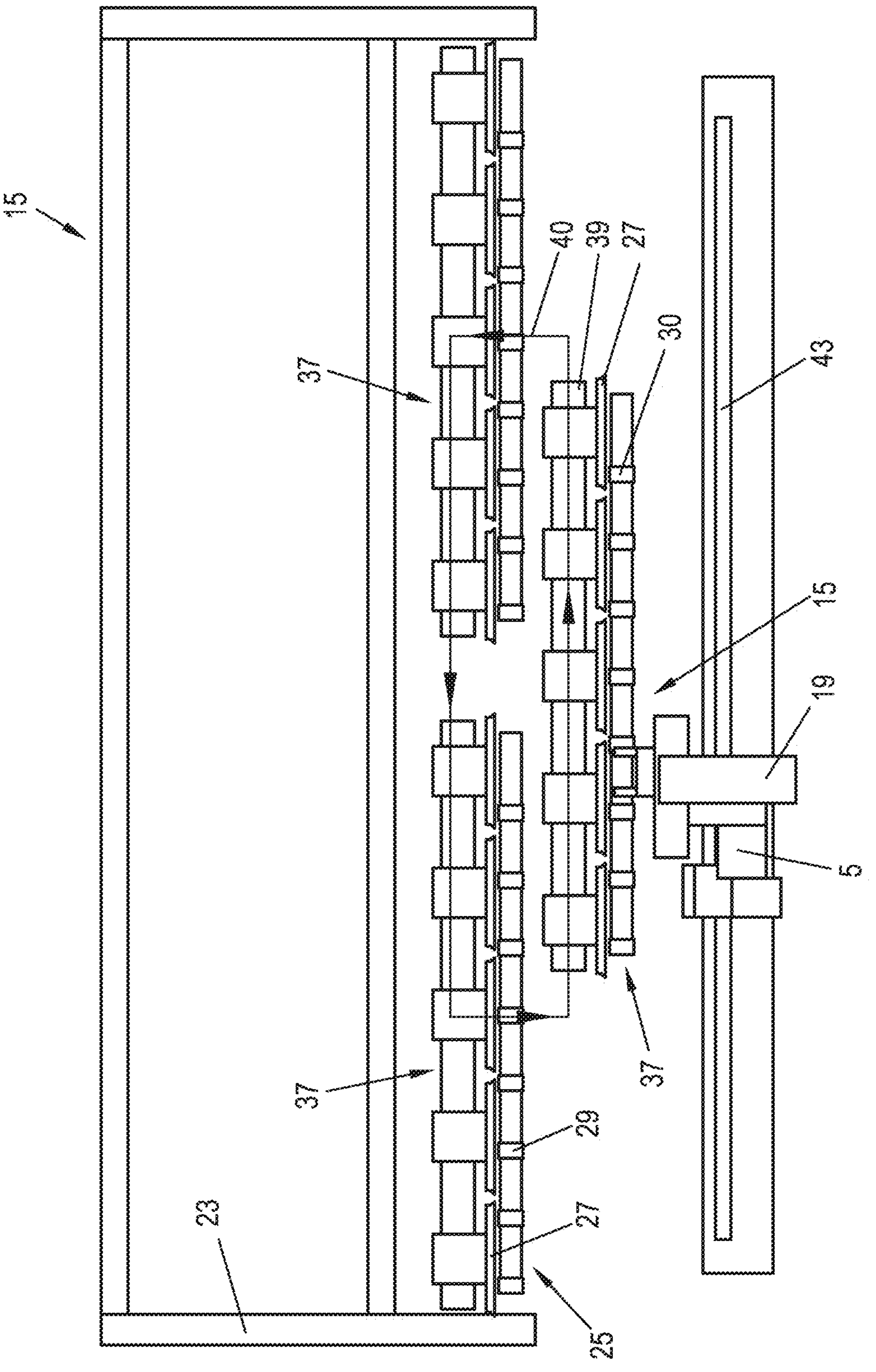
FIG. 6 shows a top view of the device from FIG. 3.
Figure 7:
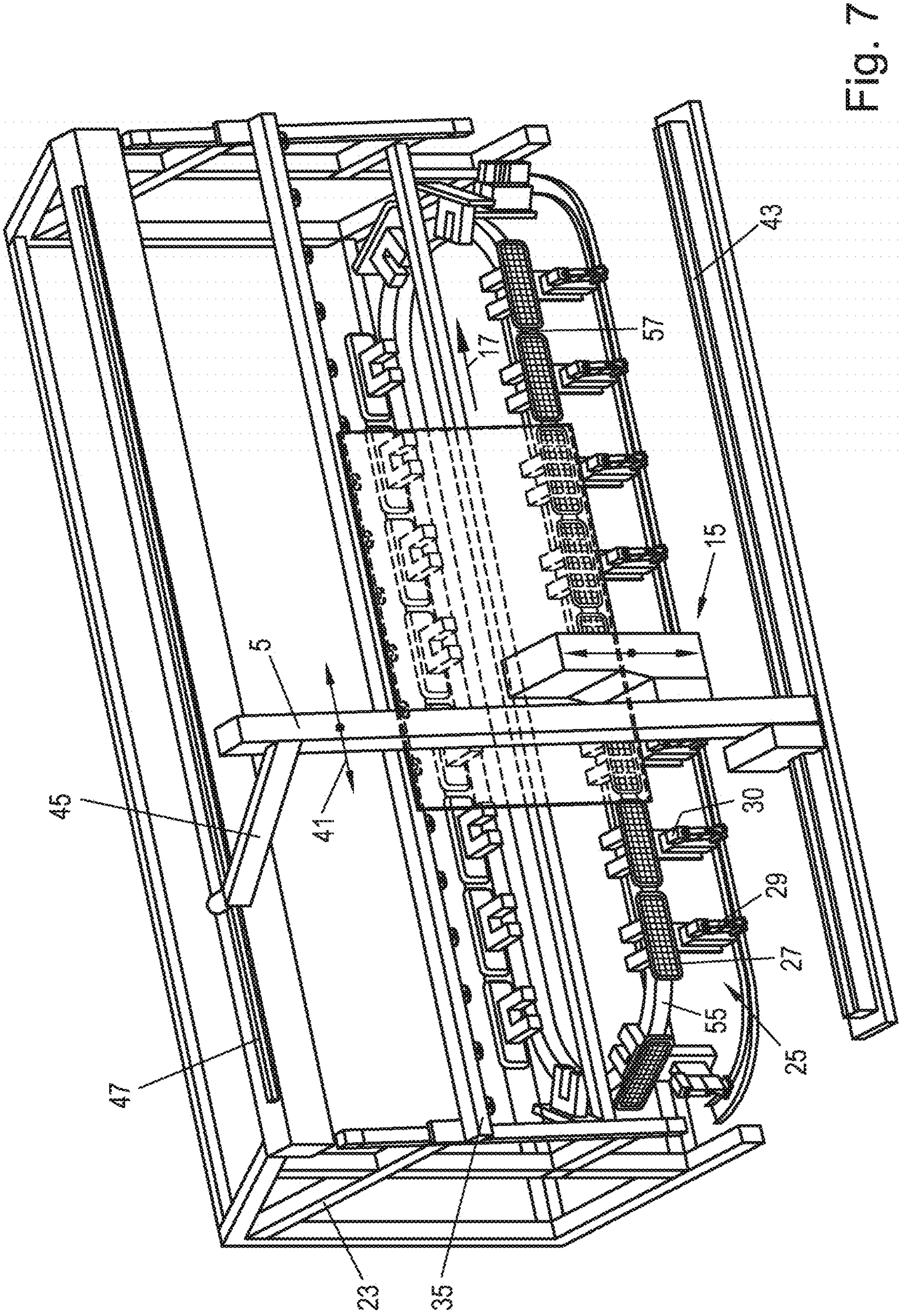
FIG. 7 shows a second embodiment in oblique view.
Figure 8:
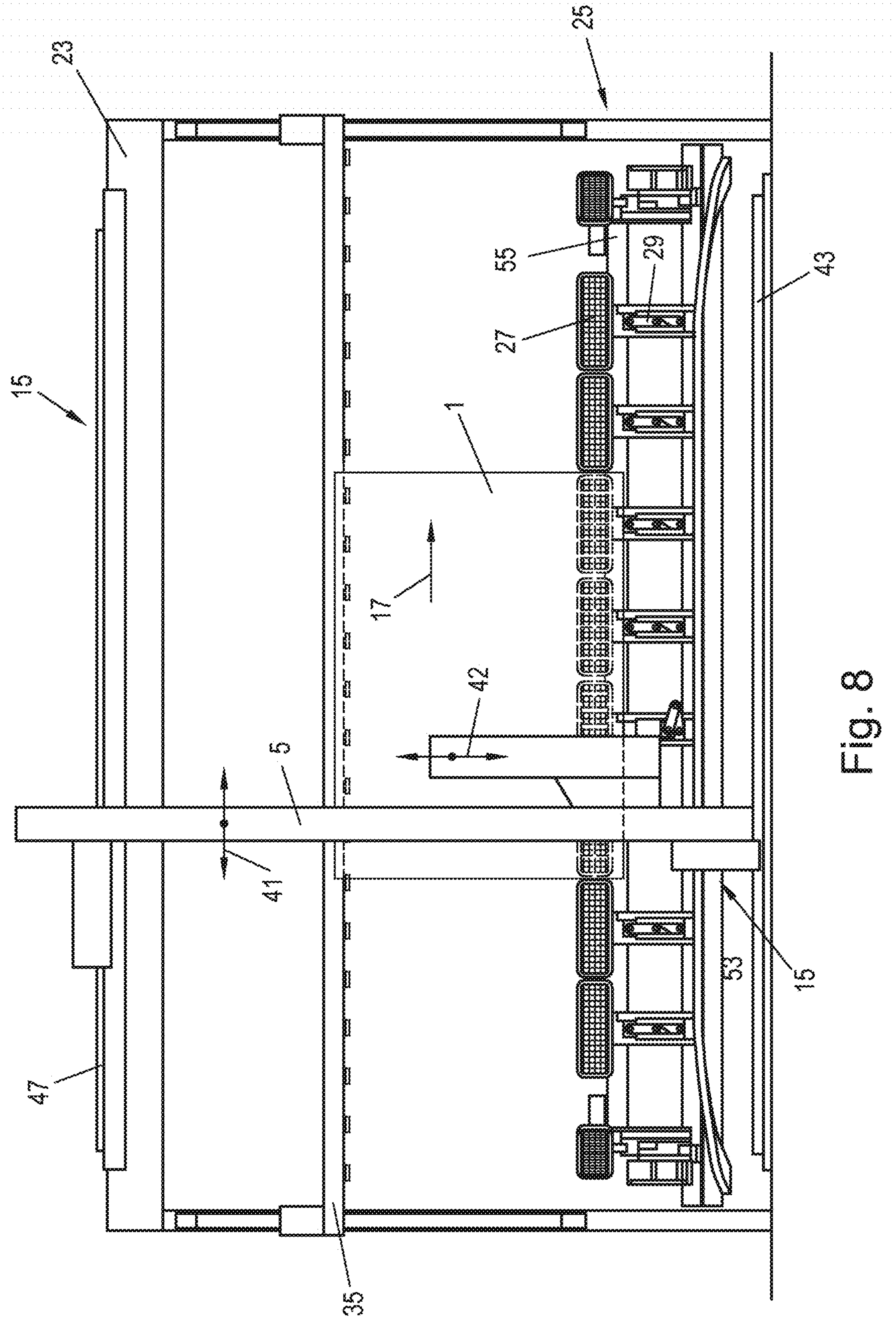
FIG. 8 shows the second embodiment in front view.
Figure 9:
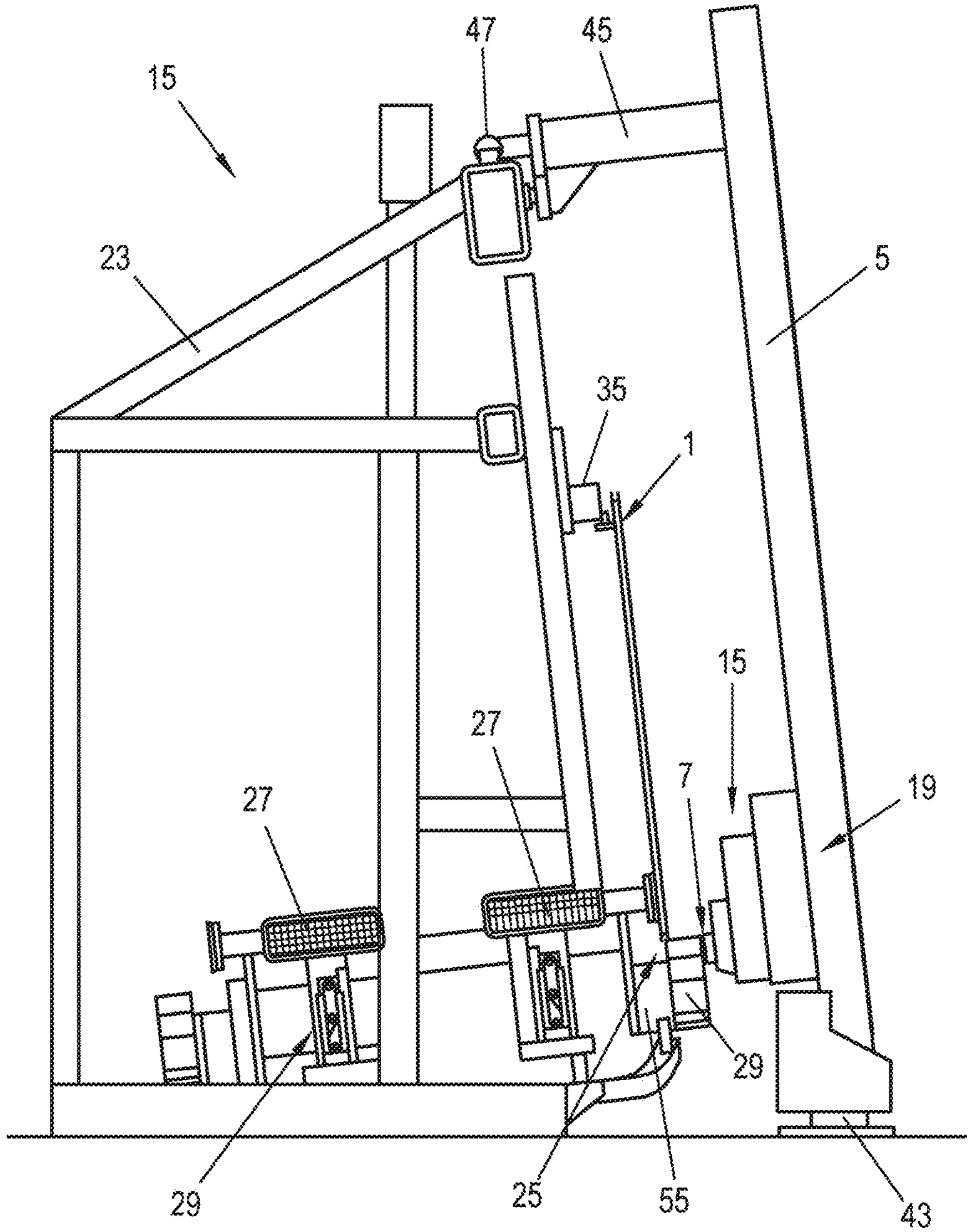
FIG. 9 shows the second embodiment in side view.
Figure 10:
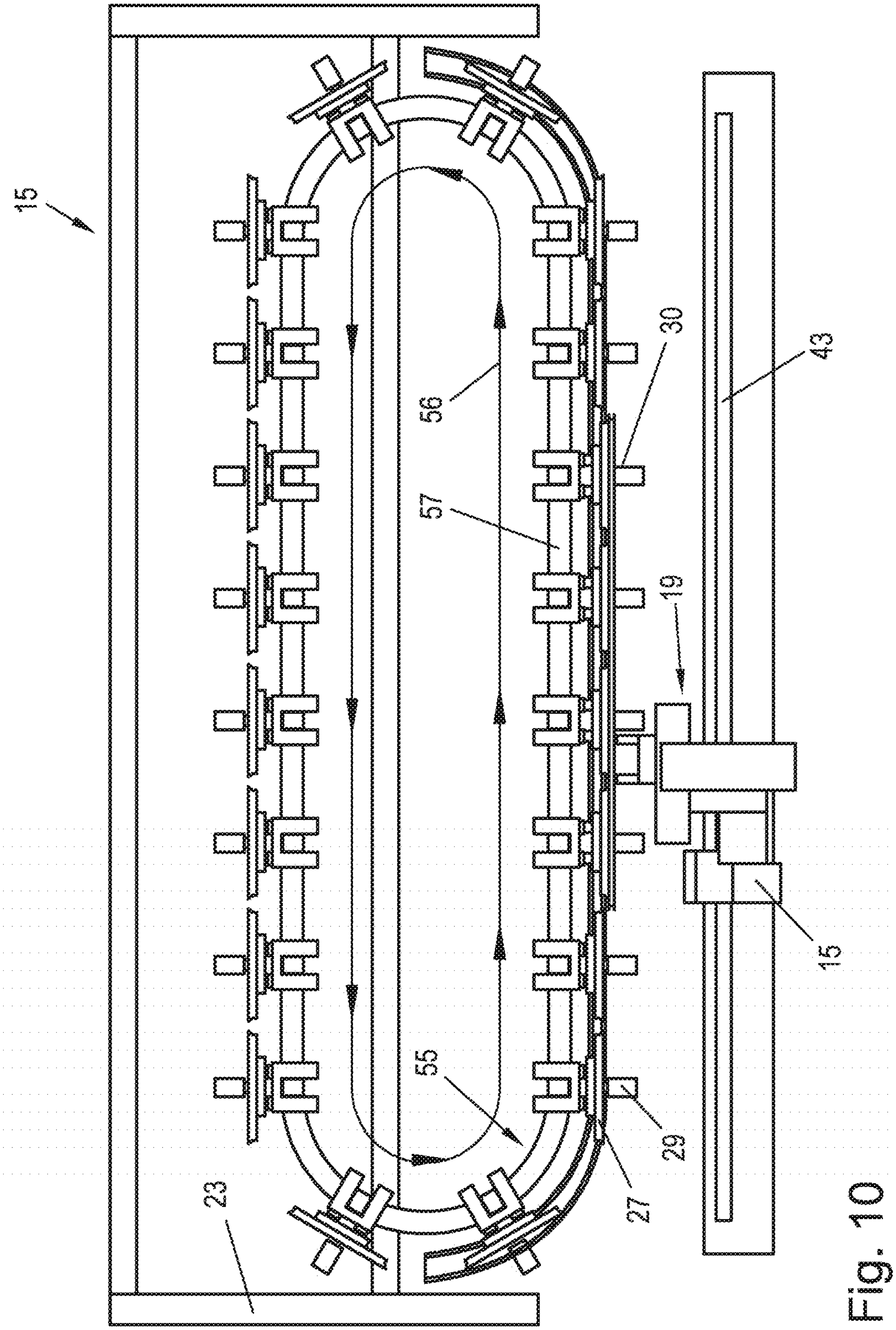
FIG. 10 shows the second embodiment in top view.

The conveying system 25 of the first embodiment (FIGS. 3 to 6) comprises three conveying units 37 with five suction devices 27 in each case and support elements 29 assigned thereto, which elements are mounted on the same carrier 39, as the top view of FIG. 6 shows in particular. The height orientation of the support heads 30 of the support elements 29 can be adjusted correspondingly to the position of the lower edge of the front glass pane 31 of the insulating glass blank 1.

The conveying units 37, comprising suction devices 27 and support elements 29, are moved in a circuit (arrow 40 in FIG. 6), in such a way that in each case only the currently required conveying unit 37 is moved in the conveying plane of the insulating glass blank 1. As soon as an insulating glass blank 1 has been sealed and removed, the conveying unit 37, as is shown on the right in FIG. 6, is moved back toward the rear and again to the intake side of the sealing station 15.

The support elements 29 are designed in such a way that their support heads 30 can be dropped so that they do not prevent the filling (sealing) of the insulating glass blank 1 by the filling nozzle 7 when the lower, horizontal section 13 of the edge joint of an insulating glass blank 1 is sealed.

Figure 4:
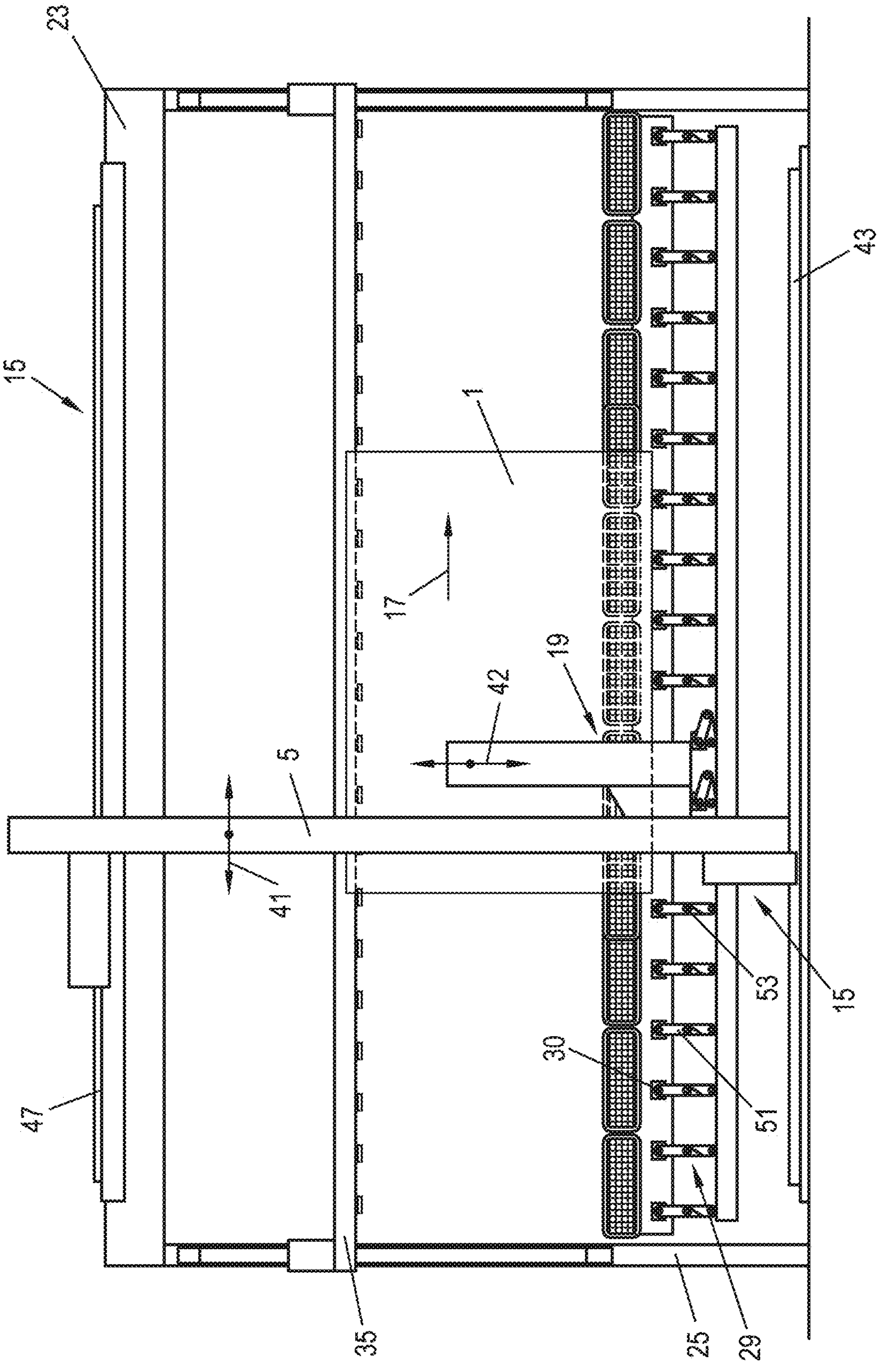
FIG. 4 shows a front view of the device from FIG. 3.
Figure 5:
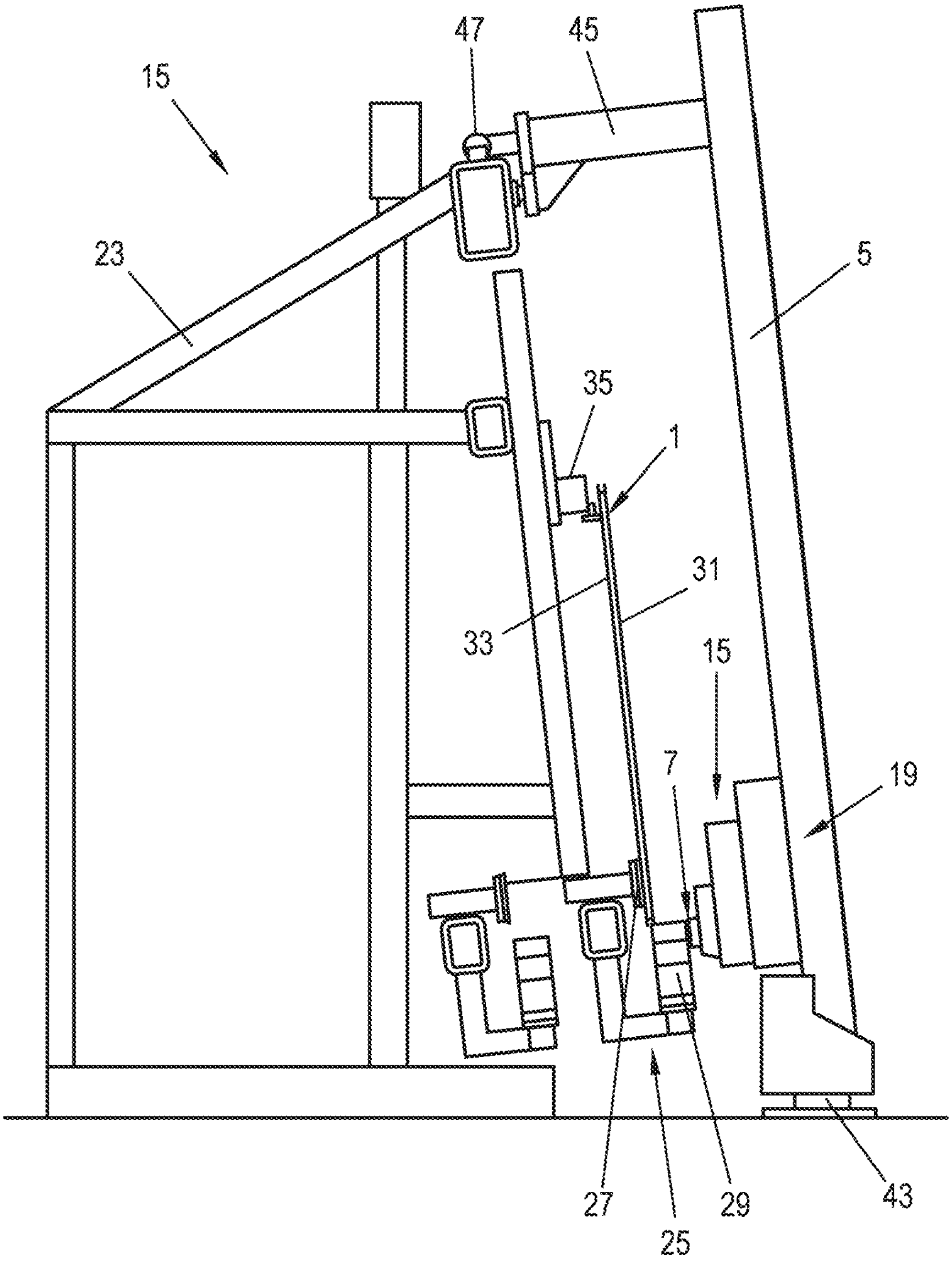
FIG. 5 shows a side view of the device from FIG. 3.

For example, the support elements 29 are designed in such a way that their support heads 30 in the area of the filling nozzle 7 are dropped by an actuating element 49—assigned to the sealing head 19 with filling nozzle 7—into the position that is shown in the front view (FIG. 4). To this end, articulated levers 51 of the support elements 29, which lie in operating position with their support heads 30 on the lower edge of the front glass pane 31 of the insulating glass blank 1, are bent. In the active position, which the support elements 29 occupy when they are not in the area of a filling nozzle 7, the articulated levers 51 are extended. The articulated levers 51 are designed in such a way that they do not bend under the weight of the front glass pane 31 of the insulating glass blank 1, but rather only bend when force is exerted by the actuating element 49 in the area of the joint 53 of an articulated lever 51 on the latter.

The sealing nozzle 7 is guided to move back and forth via a sealing head 19 on the essentially vertical beam 5 (arrow 42). The beam 5 itself can be moved along the machine frame 23 in the horizontal direction, i.e., parallel to the conveying direction (arrow 17).

To this end, the beam 5 is mounted to be able to move with its lower end on a rail 43 that is arranged in front of the sealing station 15. In addition, the beam 5 is guided to be able to move over a cantilever 45 on a guide rail 47 that is fastened onto the upper edge of the machine frame 23.

Since the beam 5, on which the sealing head 19 with its filling nozzle 7 is guided to be able to move back and forth (arrow 42), can be moved in the conveying direction (horizontal, double arrow 41), it can be entrained with the latter while sections of the edge joint of the insulating glass blank 1 are being sealed.

This makes possible the procedure according to the invention in which the insulating-glass blank 1 during the sealing in the sealing station 15 does not remain standing, but rather is moved constantly. The relative movements between the sealing head 19 with filling nozzle 7 and the edge joint of the insulating glass blank 1 are achieved by moving the insulating glass blank 1 using the conveying system 25 and step-by-step (intermittent) movement of the filling nozzle 7 both crosswise to the conveying direction (double arrow 42) and in the horizontal direction (double arrow 41) in or against the conveying direction (arrow 17 of FIGS. 1 and 2).

The embodiment of a device according to the invention (sealing station) 15, shown in FIGS. 7 to 10, operates in principle just like the embodiment that is shown in FIGS. 3 to 6. In the embodiment shown in FIGS. 7 to 10, the suction devices 27 and support elements 29 forming the conveying system 25 are run on a circular track 55 along a self-contained path (arrow 56 in FIG. 10). In the area of the front section 57 of the track 55 lying parallel to the conveying plane, the suction devices 27 and support elements 29 are effective for the transport of insulating glass blanks 1 during sealing. In the embodiments shown in FIGS. 7 to 10, one support element 29 is assigned to each suction device 27.

Figure 11:
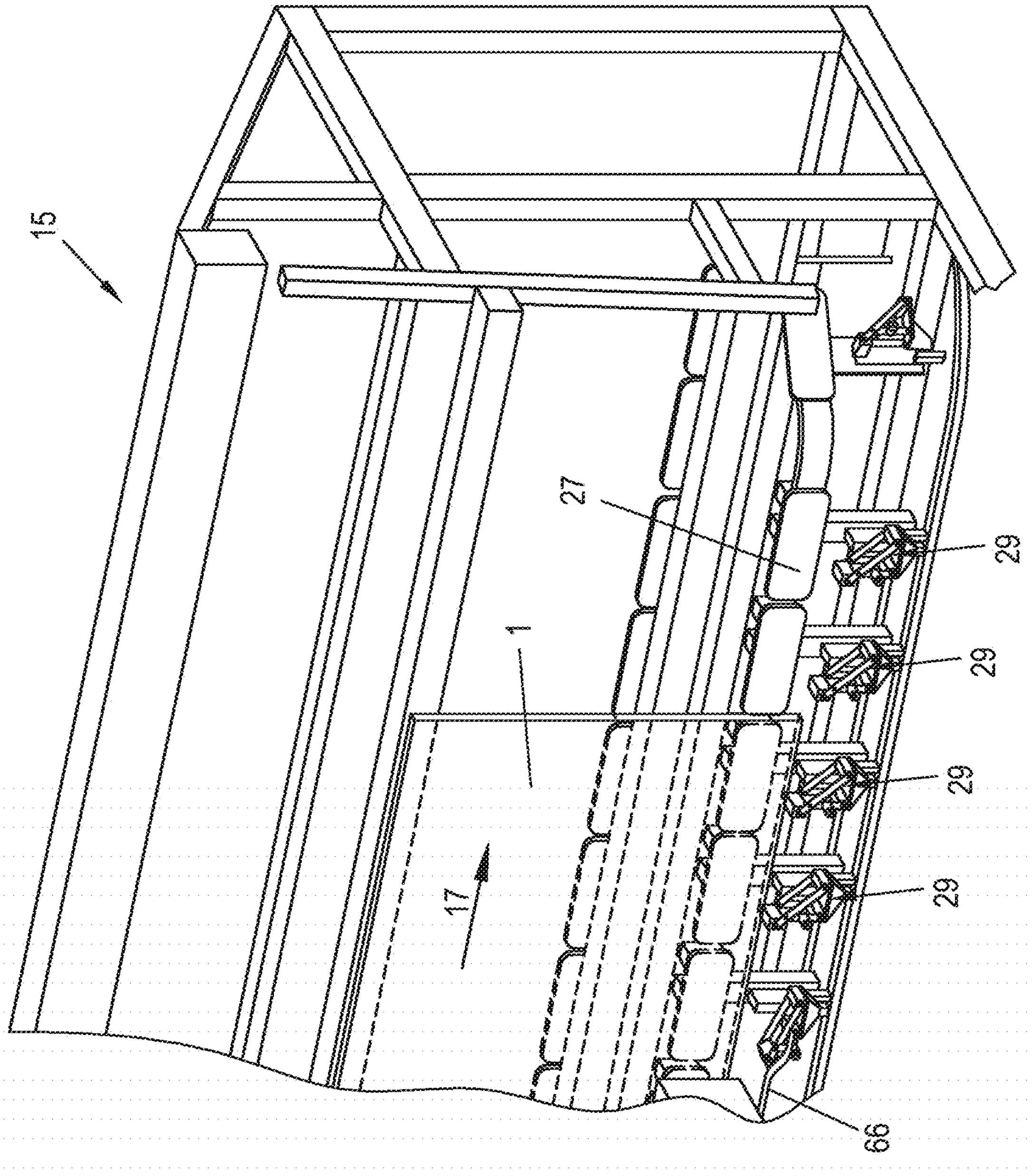
FIG. 11 shows in (partial) oblique view the embodiment, shown in FIGS. 7 to 10, with a modified configuration of the support elements.

In the embodiment of the sealing station 15 according to the invention, shown in FIG. 11, support elements 29 that are changed relative to the embodiment of the support elements 29, shown in FIGS. 7 to 10, are provided. The embodiment of the support elements 29 shown in FIGS. 11 and 12 can also be provided in the case of the embodiment of the sealing station 15 according to the invention, shown in FIGS. 3 to 6.

Figure 12:
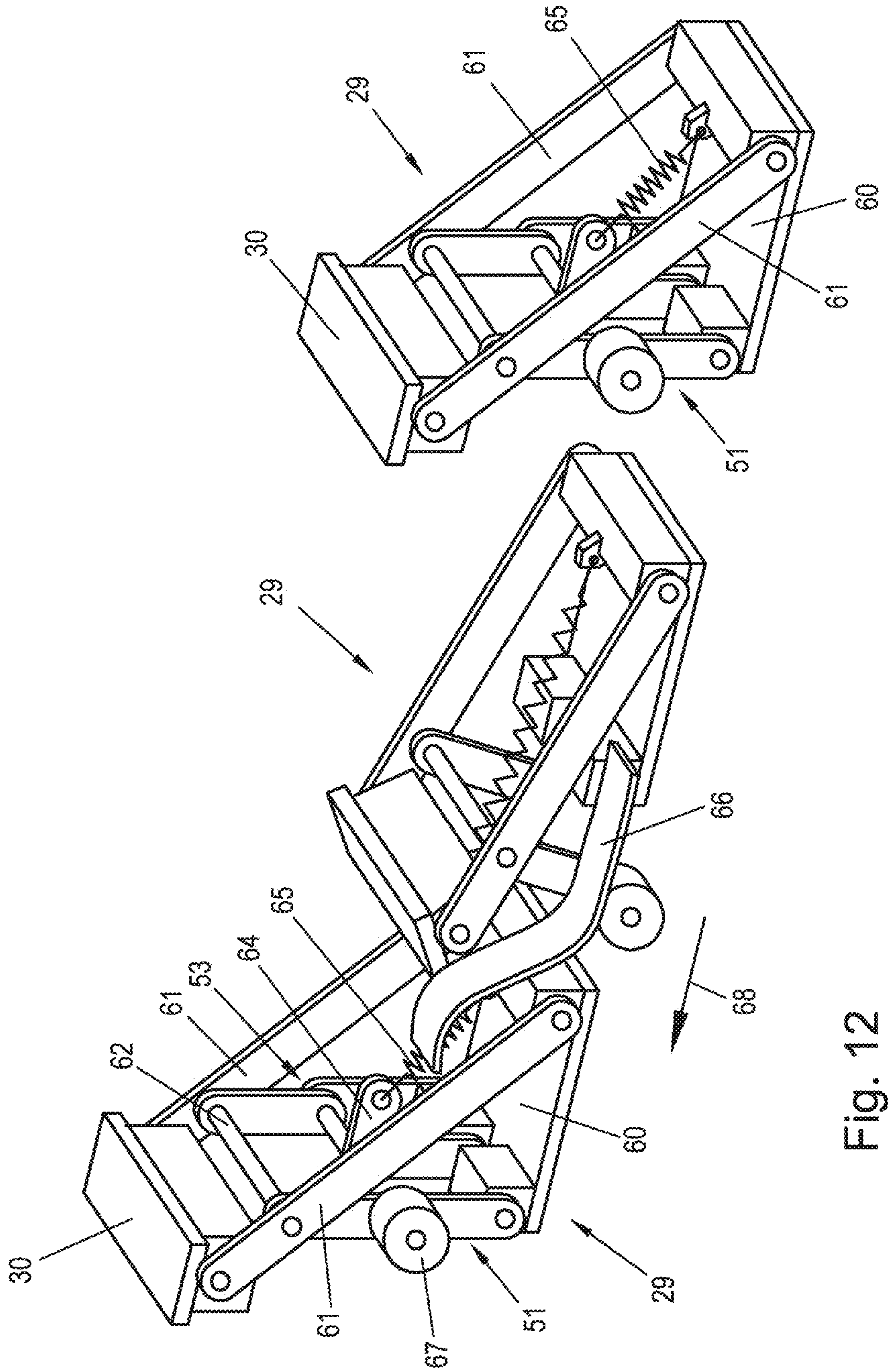
FIG. 12 shows three support elements with an actuating link.

The support elements 29 of FIGS. 11 and 12 have levers 61 mounted to pivot on a base plate 60, which levers carry the support head 30 to pivot on their free ends. Between the base plate 60 and the levers 61, an articulated lever 51 is provided with its joint 53 formed by an axis 62. An arm 64 is fastened to the axis 62 of the joint 53. Between the free end of the arm 64 and the base plate 60, a tension spring 65 is provided. The tension spring 65 loads the arm 64 in such a way that the articulated lever 51 is moved into operating position, shown in FIG. 12 on the right and left, with a raised support head 30 of the support element 29. This position of the articulated lever 51 is preferably a stable upper dead center position.

In the embodiment of the support elements 29, shown in FIGS. 11 and 12, as an actuating element 49, an actuating link 66 is arranged on the sealing head 19. The actuating link 66 clamps onto an actuating roller 67, which is arranged on the axis 62 of the articulating lever 51, and produces a buckling of the articulated lever 51 in the position, shown in the center of FIG. 12, with a lowered support head 30 because of the relative movement between the sealing head 19 and the support element 29, symbolized by an arrow 68 in FIG. 12. As soon as the actuating link 66 no longer clamps onto a support element 29, more precisely its actuating roller 67—when the support element 29 is thus no longer in the area of the filling nozzle 7 that is arranged on the sealing head 19 (or on the sealing head 21)—the actuating lever 51 under the action of the tension spring 65 again occupies its operating position with a raised support head 30.

On the release side, the conveying system 25 for insulating glass blanks 1 that are to be sealed in the embodiment shown in FIGS. 3 to 6 can, just like the embodiment shown in FIGS. 7 to 10 (on the right in FIG. 3 and in FIG. 7), be extended enough to convey sealed insulating glass blanks 1 far enough away from the sealing station 15 that insulating glass blanks 1, which have been sealed, can be easily removed for stacking.

In summary, an embodiment of the invention can be described as follows:

During sealing of insulating glass blanks 1, the insulating glass blank 1 is moved essentially continuously through a sealing station 15. When sections 3, 9 of the edge joint of the insulating glass blank 1 that are oriented crosswise or obliquely to the conveying direction (arrow 17) are filled with sealing compound that exits from a filling nozzle 7, the filling nozzle 7 is also moved in the conveying direction (arrow 17). When sealing compound from the filling nozzle 7 is introduced into the sections 11, 13 of the insulating glass blank 1 parallel to the conveying direction (arrow 17), the filling nozzle 7 is not moved in the conveying direction (arrow 17) or is moved at a speed other than the speed at which the insulating glass blank 1 is moved.

The invention claimed is:

1. A method for sealing at least one insulating glass blank (1) comprising:

using at least one filling nozzle (7) to introduce sealing compound into an edge joint of the insulating glass blank (1), whereby relative movements between the at least one filling nozzle (7) and the insulating glass blank (1) are created by moving the filling nozzle (7) and the insulating glass blank (1), wherein the insulating glass blank (1) is moved in a conveying direction (17) while the sealing compound is being introduced into the edge joint from the at least one filling nozzle (7), wherein, as sealing compound is being introduced into sections (11, 13) of the edge joint of the insulating glass blank (1) which are oriented parallel to the conveying direction (17), the at least one filling nozzle (7) is at a standstill in the conveying direction (17) or is moved at a speed V2 that is different from a speed V1 of movement of the insulating glass blank (1), wherein, as the sealing compound is being introduced into sections (3, 9) of the edge joint which are oriented transversely to the conveying direction (17), the at least one filling nozzle (7) is moved at the same speed V2 as the insulating glass blank (1) in the conveying direction and additionally transversely (42) to the conveying direction (17), and wherein while the insulating glass blank (1) is being sealed, the insulating glass blank (1) is moved continuously in the conveying direction.

2. The method according to claim 1, wherein as sealing compound is being introduced into sections of the edge joint which enclose an angle with respect to the conveying direction, the at least one filling nozzle (7) is moved transversely (42) to the conveying direction (17) in addition to moving parallel to the conveying direction (17).

3. The method according to claim 1, wherein the at least one filling nozzle (7) is a single filling nozzle (7) from which the sealing compound is introduced in succession into all sections (13, 9, 11, 3) of the edge joint of the insulating glass blank (1).

4. The method according to claim 1, wherein the at least one filling nozzle (7) is two filling nozzles (7) that introduce the sealing compound into the insulating glass blank (1).

5. The method according to claim 1, wherein the at least one filling nozzle during introduction of sealing compound into sections of the edge joint of the insulating glass blank, which are oriented parallel to the conveying direction, is stationary in the conveying direction.

6. The method according to claim 1, wherein the at least one filling nozzle during introduction of sealing compound into sections of the edge joint, oriented crosswise to the conveying direction, is moved at the same speed as the insulating glass blank in the conveying direction and in addition crosswise to the conveying direction.

7. The method according to claim 1, wherein the at least one filling nozzle, in addition to moving parallel to the conveying direction, is moved crosswise to the conveying direction when filling compound is being introduced into sections of the edge joint, which sections form an angle in the conveying direction.

8. A method for sealing at least one insulating glass blank (1) comprising:

using at least one filling nozzle (7) to introduce sealing compound into an edge joint of the insulating glass blank (1), whereby relative movements between the at least one filling nozzle (7) and the insulating glass blank (1) are created by moving the filling nozzle (7) and the insulating glass blank (1), wherein the insulating glass blank (1) is moved in a conveying direction (17) while the sealing compound is being introduced into the edge joint from the at least one filling nozzle (7), wherein, as sealing compound is being introduced into sections (11, 13) of the edge joint of the insulating glass blank (1) which are oriented parallel to the conveying direction (17), the at least one filling nozzle (7) is at a standstill in the conveying direction (17) or is moved at a speed V2 that is different from a speed V1 of movement of the insulating glass blank (1), wherein, as the sealing compound is being introduced into sections (3, 9) of the edge joint which are oriented transversely to the conveying direction (17), the at least one filling nozzle (7) is moved at the same speed V2 as the insulating glass blank (1) in the conveying direction and additionally transversely (42) to the conveying direction (17), and wherein as sealing compound is being introduced into sections of the edge joint which enclose an angle with respect to the conveying direction, the at least one filling nozzle (7) is moved transversely (42) to the conveying direction (17) in addition to moving parallel to the conveying direction (17).

9. The method according to claim 8, wherein the at least one filling nozzle, in addition to moving parallel to the conveying direction, is moved crosswise to the conveying direction when filling compound is being introduced into sections of the edge joint, which sections form an angle in the conveying direction.

10. A device for sealing at least one insulating glass blank with application of the method according to claim 1, comprising:

the at least one filling nozzle (7), from which the sealing compound is introduced into the edge joint of the insulating glass blank (1), and a conveyor (25) for moving the insulating glass blank (1) during the sealing, wherein the at least one filling nozzle (7) is movable parallel to the conveying direction (arrow 17) of the conveyor (25), wherein the at least one filling nozzle (7) is arranged on a sealing head (19) which is movable on a beam (5) transversely (42) to the conveying direction (17), wherein the beam (5) which carries the sealing head (19) is movable parallel to the conveying direction (17) of the insulating glass blank (1), and wherein the beam (5) is movable synchronously with the insulating glass blank in the conveying direction in order to introduce the sealing compound into sections (3, 9) of the edge joint which are oriented transversely to the conveying direction.

11. The device according to claim 10, wherein the conveyor (25) comprises a linear conveyor that clamps ono a lower edge of the insulating glass blank (1) and a roller beam (35) that is provided in the area of an upper edge of the insulating glass blank (1).

12. The device according to claim 11, wherein the linear conveyor comprises suction devices (27) and support elements (29), which can be moved together and synchronously in the conveying direction of the insulating glass blank (1).

13. The device according to claim 12, further comprising a machine frame (23), wherein the suction devices (27) laterally clamp onto the surface of one glass pane (33) of the insulating glass blank (1) that faces the machine frame (23), and wherein the support elements (29) clamp from below onto the glass pane (31) of the insulating glass blank (1) that faces away from the machine frame (23) of the device (15).

14. The device according to claim 12, wherein the support elements (29) have a support head (30) and a bendable support arm (51).

15. The device according to claim 12, wherein the suction devices (27) and the support elements (29) of the linear conveyor, combined into conveyor units (37), are arranged on a carrier (39).

16. The device according to claim 12, wherein the suction devices (27) and the support elements (29) are guided onto a continuous, self-contained conveyor track (55).

17. The device according to claim 10, wherein the at least one filling nozzle (7) is arranged on the sealing head (19), which can be adjusted on the beam (5) crosswise to the conveying direction, and wherein the beam (5), which carries the sealing head (19), can be moved parallel to the conveying direction of the insulating glass blank (1).

* * * * *